US006411951B1

(12) United States Patent
Galindo-Legaria et al.

(10) Patent No.: US 6,411,951 B1
(45) Date of Patent: Jun. 25, 2002

(54) EVALUATING SQL SUBQUERIES

(75) Inventors: Cesar A. Galindo-Legaria, Bellevue; Shaun J. Cooper, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/212,558

(22) Filed: Dec. 16, 1998

(51) Int. Cl.[7] ................................................ G06F 17/00
(52) U.S. Cl. ................................ 707/3; 707/4; 717/140
(58) Field of Search ......................... 707/1–206; 717/1, 717/8, 9, 2–7, 140–148; 711/100; 709/247, 101–102; 706/45–47

(56) References Cited

U.S. PATENT DOCUMENTS

| | | | |
|---|---|---|---|
| 5,724,570 A | | 3/1998 | Zeller et al. .................... 707/3 |
| 5,956,704 A | * | 9/1999 | Gautam et L. .................. 707/8 |
| 5,970,490 A | * | 10/1999 | Morgenstern ................. 707/10 |
| 6,021,405 A | * | 2/2000 | Celis et al. ..................... 707/2 |

OTHER PUBLICATIONS www.informix.com/answers/oldsite/answers/pubs/html/dbdk/extend/04.fm.1.html, 1998.*
Srinivasan et al., "Extensible Indexing: A Framework for Integrating Domain–Specific Indexing Schemes into Oracle 8i", Data Engineering, 2000, Proceedings, 16th International Conference on, pp. 91–100, Feb. 2000.*
Informix Software, "Extending Informix: Universal Server: Data Types", Version 9.1, Mar. 1997.*
Chaudhuri, "An Overview of Query Optimization in Relational Systems", ACM PODS 1998, Seattle, Washington, pp. 34–43, Jun. 1998.*
PODS '98 Technical Program, 1998, Seattle Washington, Jun. 1998.*
www.informix.com/answers/oldsite/answers/pubs/html/dbdk/extend/02.fm.1.html, 1998.*
Dayal, U., "Of Nests and Trees: A Unified Approach to Processing Queries That Contain Nested Subqueries, Aggregate, and Quantifiers", *Proceedings of the Thirteenth International Conference on Very Large Data Bases*, Brighton, England, 197–208, (1987).
Ganski, R.A., et al., "Optimization of Nested SQL Queries Revisited", *Proceedings of Association for Computing Machinery Special Interest Group on Management Data*, 22–33, (May 1987).
Graefe, G., "Query Evaluation Techniques for Large Databases", *ACM Computing Surveys*, 25 (2), 73–170, (Jun., 1993).
KIm, W., "On Optimizing an SQL—like Nested Query", *ACM Transactions on Database Systems*, 7(3), pp. 443–469, (Sep. 1982).
Melton, J., et al., "Predicates", *In: Understanding the New SQL: A Complete Guide*, Morgan Kaufmann Publishers, San Francisco, CA, 125–147.
Muralikrishna, M., "Improved Unnesting Algorithms for Join Aggregate SQL Queries", *Proceedings of the 18th International Conference on Very Large Data Bases*, Vancouver, British Columbia, Canada, pp. 91–102, (Aug. 1992).

* cited by examiner

*Primary Examiner*—David Jung
(74) *Attorney, Agent, or Firm*—Woodcock Washburn LLP

(57) ABSTRACT

SQL subqueries are converted into equivalent expressions rooted by a special relational operator. The special relational operator assumes properties based on the type of the expression containing the subquery. The context of the subquery is also factored into the special relational operation. The relational operator itself is optimized, when possible, into a standard join operation. The conversion process maintains a list of parameter dependencies within the query and the relational operator utilizes this list at execution time to decrease the amount of processing required to produce the query output.

13 Claims, 13 Drawing Sheets

200

| | C1 206 |
|---|---|
| 201 | 2 |
| 202 | 3 |
| 203 | 4 |
| 204 | 6 |
| 205 | 8 |

T1

210

| | C1 206 | X 207 |
|---|---|---|
| 211 | 2 | False |
| 212 | 3 | True |
| 213 | 4 | False |
| 214 | 6 | False |
| 215 | 8 | False |

| | C1 206 |
|---|---|
| 201 | 2 |
| 202 | 3 |
| 203 | 4 |
| 204 | 6 |
| 205 | 8 |

T1

230

| | C1 236 | Y 237 |
|---|---|---|
| 231 | 2 | False |
| 232 | 3 | False |
| 233 | 4 | True |
| 234 | 6 | False |
| 235 | 8 | True |

TT1

220

| | C1 227 |
|---|---|
| 221 | 1 |
| 222 | 4 |
| 223 | 7 |
| 224 | 8 |
| 225 | 9 |
| 226 | 11 |

| Correlated Parameter Identifier |
|---|
| 901 |
| Operator1 | 902
| Operator2 | 902
| ......... |
| Operator N | 902

| Operator1 | 1001
| Operator2 | 1001
| Operator3 | 1001
| ......... |
| Operator N | 1001

FIG. 10

EVALUATING SQL SUBQUERIES

FIELD OF THE INVENTION

This invention relates generally to relational databases, and more particularly to evaluating subqueries in the SQL language used by relational database management systems.

COPYRIGHT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1996, Microsoft Corporation, All Rights Reserved.

BACKGROUND OF THE INVENTION

Under certain conditions, the SQL language allows the use of a basic block Select/from/Where relational expression, which is a table-valued, inside scalar expressions. Such a relational expression inside a scalar expression is called a subquery. The SQL2 standard specifies three basic forms of subqueries.

In a scalar-valued subquery, the result must be a table with at most one row and one column, whose value is used in the scalar expression. For example, 2 * (Select Avg(Salary) from Employees).

An existential subquery returns a boolean value based on whether the subquery returns any rows. For example, Case When Exists(select * from shippers where shipperid=20) Then 1 Else 0 End.

The third form, the quantified comparison, also returns a boolean value, which is obtained by comparing a scalar value with a list of values returned by the subquery. For example, Case When X<>ALL(Select Customerid from Customers) Then 1 Else 0 End.

Scalar expressions containing subqueries will often be used in larger relational expressions, and can use columns or variables from its environment. A use of such an "outer" variable is called a correlation. For example, the following query uses a subquery to find customers who have placed an order:

Select * from Customers c
where Exists(Select * From Orders o where o.customerid=c.customerid).

Database engines typically separate a query executor (QE) component from an expression service component (ES). The QE deals with execution of the relational parts of queries, and it calls a simpler ES module that deals with evaluation of scalar expressions, as needed. For example, in applying a filter on a table, the QE would consider each row in turn, call the ES to evaluate the filter condition and, based on the scalar result, either discard the row or pass it to a consumer. Thus, even the most straightforward evaluation of subqueries requires the ES to call back into the QE to resolve the relational expression.

There is a potentially large amount of processor state associated with the QE, and requiring the ES to call back requires the use of conceptually separate instances of the QE that get activated in a recursive fashion. This requires setting up and removing a context for each instantiation of the QE. Since scalar expressions are usually called once per row to process the expression, this expensive recursive invocation will be done many times for large databases. Additionally, this approach to the processing of subqueries requires complex implementation for the database engine.

In some cases, the use of a subquery can be replaced by a relation join as observed by W. Kim in "On optimizing an SQL-like nested query," *ACM Transactions on Database Systems*, Vol. 7, No. 3, September 1982, pp. 443–469. Such a substitution removes the need for recursive calls between QE and SE, and allows the use of any join algorithm, for example a hash join, or merge join as discussed by G. Graefe in "Query evaluation techniques for large databases," *ACM Computing Surveys*, Vol. 25, No. 2, 1993, pp. 73–170. Additional cases of subqueries which can be removed in this fashion have been proposed by U. Dayal in "Of nests and trees: A unified approach to processing queries that contain nested subqueries," *Proceedings of the International Conference on Very Large Databases '87*, pp. 197–208, R. A. Ganski, and H. K. T. Wong in "Optimization of nested SQL queries revisited," *Proceedings of ACM SIGMOD '87 Internaltional Conference on Management of Data*, San Francisco, Calif., pp. 23–33, and M. Muralikrishna in "Improved unnesting algorithms for join aggregate SQL queries," *Proceedings of the International Conference of Very Large Databases '92*, pp. 91–102.

There is a need in the art for a relational database management system that utilizes subquery substitution for relational queries and extends the capabilities of the substitution structure.

SUMMARY OF THE INVENTION

The above-mentioned shortcomings, disadvantages and problems are addressed by the resent invention, which will be understood by reading and studying the following specification.

SQL subqueries are converted into equivalent expressions having a special relational operator. The special relational operator assumes properties based on the type of the expression containing the subquery. The context of the subquery is also factored into the special relational operation. The relational operator itself is optimized, when possible, into a standard join operation. The conversion process maintains a list of parameter dependencies within the query and the relational operator utilizes this list at execution time to decrease the amount of processing required to produce the query output.

The special relational operator and processing of the present invention enables more efficient query execution because the properties of the special relational operator optimize the execution flow, and omit both unnecessary and redundant processes. Furthermore, the absence of subqueries in the converted query permits the implementation of a less complex database execution engine.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 2A–D are diagrams illustrating an series of SQL subqueries;

FIG. 9 is a diagram of an operator sensitive list data structure for use in the exemplary implementation of the invention; and FIG. 10 is a diagram of a re-compute set data structure for use in the exemplary implementation of the invention.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, an overview of the invention is presented. In the third section, methods for an exemplary embodiment of the invention are provided. In the fourth section, a particular implementation of the invention is described. Finally, in the fifth section, a conclusion of the detailed description is provided.

Hardware and Operating Environment

Figure 1:
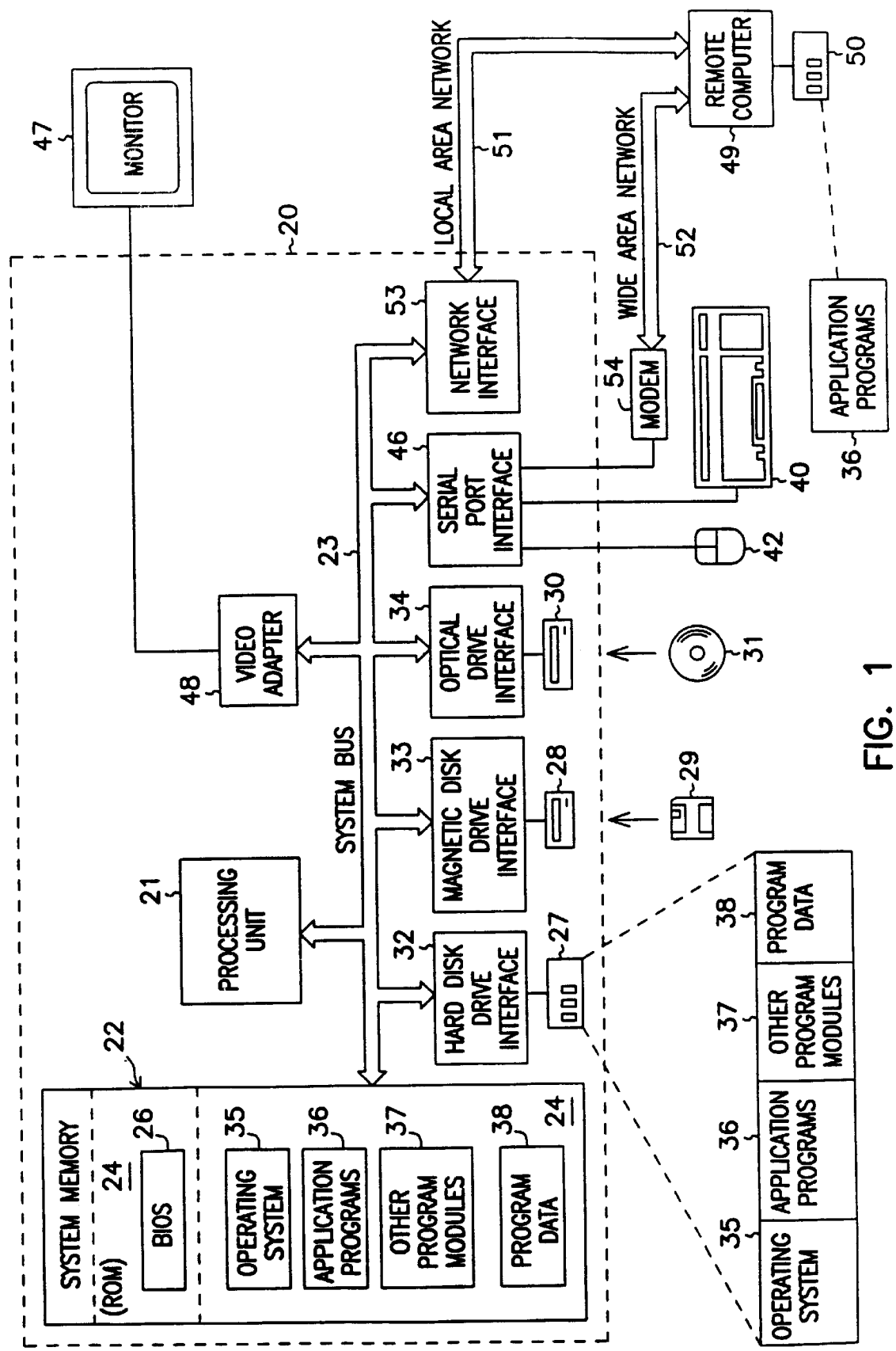
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of he invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

Overview

An overview of an exemplary embodiment of a database management system that utilizes the present invention is described by reference to FIGS. 2A–D, 3A–C, 4A–B, and 5. This section is divided into four parts. First, a brief description of the process of removing subqueries from SQL queries in accordance with an exemplary embodiment of the invention is given. Next, an Apply operator for use by the exemplary embodiment of the invention is introduced in conjunction with the conversion of the subqueries of the previous section. The third subsection briefly discusses the handling of context by the exemplary embodiment of the invention when processing subqueries. Finally, a process used by the exemplary embodiment of the invention during execution of the converted subqueries is described.

Converting Subqueries

A series of simple relational queries using the operator Select is used to describe the basic approach employed by the invention in converting subqueries. As well-known in the art, a SQL Select query can be represented as R'=Select (R, e), where e is an expression used to evaluate each row of an input relation, or table R, to produce a resulting relation R'.

When the query (q1) Select * from T1 where T1.C1=3 is applied against a table T1 200 shown in FIG. 2A, it returns those of rows 201–205 in T1 which have a "3" in their first column C1 206. Because the result of e is either true, i.e. T1.C1=3, or false, T1.C1<>3, the result of the expression can be visualized as a column X 207 of boolean values that are appended to T1 to create a temporary table TT1 210. The output R' of the Select query is the row(s) from T1 206 that have a corresponding row in TT1 with X=True. In this case, R'={3}, since only row 212 has column X=True.

Consider now a query in which R' is dependent upon the existence of a relationship, or correlation, between columns of two relations, such as T1 200 and T2 220 shown in FIG. 2B. For example, the query (q2) Select * from T1 where Exists (Select * from T2 where T1.C1=T2.C1)

returns only those of rows 201–205 in T1 with C1 206 which matches rows 221–226 in T2 on column one C1 227. T1 is called an "outer" relation, T2 is called an "inner" relation, and T1.C1 is called a "correlated parameter." In this case, the expression e contains an inner query, or subquery, i.e., Select(R, e) where e=Exists(subquery). The inner query is resolved based on T1.C1=T2.C1 or e2. e2 evaluates to either true or false for each row of T1, and so a temporary table TT1 can be created by appending the result of e2 as column Y 237. The outer Select query outputs R'={4, 8}.

Combining the expressions from the previous two examples in an OR relationship creates the query.

(q3) Select * from T1 Where T1.C1=3 or Exists (Select * from T2 Where T1.C1=T2.C1).

The results of the query q3 will be the rows 201–205 from T1 that have either "3" in the first column C1 206, (expression e1) or have a match on the first column C1 206 with a row 221–226 in T2 (expression e2), i.e., Select(R, e) where e=OR(e1, e2). Temporary table TT1 240 in FIG. 2C contains both columns X 247 (for the results of e1) and Y 248 (for the results of e2), with the output of the outer Select query being R'={3, 4, 8}.

Note that row 242 in TT1 240 has both X 247 and Y 248 columns set to True. Because this is an OR condition, resolving either e1 or Ie2 to True is sufficient to identify row 242 as satisfying the query q3 and saves on processing time. Because the resolution of e1 is not correlated to any value in T2 220, resolving e1 first and ignoring e2 if e1=True is preferable. An expression which depends only on the outer relation is referred to as a "passthrough" expression because it can be passed through to the Select operator without needing access to the inner table(s). The value of the expressions which are not resolved for the passthrough row is set to Unknown as shown in phantom column Y 249 in FIG. 2C.

A final example serves to illustrate the processing of a more complex query:

(q4) Select * from T1 where T1.C1=3 or Exists (Select * from where T1.C1=T3.C1) or Exists (Select * from T2 where T1.C1=T2.C1).

The query returns a row from T1 if the row satisfies one of the three expressions, i.e., Select(R, e) where e=OR(e1, e4), e4=OR(e3, e2), e1=T1.C1, e2=Exists(Select * from T2 where T1.C1=T2.C1), and e3=Exists (Select * from where T1.C1=T3.C1). Because e1 is a passthrough expression, any rows which satisfy e1 will not be processed against e2 or e3. Temporary table TT1 260 in FIG. 2D contains three columns, X 267 to hold the values resulting from e1, Y 268 to hold the values from e2, and Z 269 to hold the values of e3. The output of query q4 is R'={2, 3, 4, 8}.

As shown above, the general strategy employed by the exemplary embodiment of the invention to remove subqueries from scalar expressions is to replace them by scalar-valued variables. In addition to removing subqueries from scalar expression, the invention "unnests" (when possible) the subqueries by removing, from the inner expression, all references to the outer expression, in effect making the subquery into a join.

Apply Operators

The exemplary embodiment of the invention employees a join-link subquery relational operator, called "Apply," to produce the same results as the subqueries. The Apply operator has two relational children, an "outer" stream of rows, and an "inner" relational expression. Logically, the Apply operator evaluates the inner expression once for every outer row, i.e., it performs a nested loop join operation. The result of the subquery contains every outer row, exactly once, extended by new columns that depend on the evaluation of the inner expression. Because the Apply operator is join-based when all correlation variables are removed, it can be implemented by a hash and merge algorithm, can be reordered with other joins, etc., thus reducing the complexity of implementation required to handle subqueries.

The Apply operator extends the standard functioning of a join by constructing correlations between the outer relation and the inner expression. Viewed as a join, the Apply operator can often assume a "True" match predicate. But this doesn't reduce it to a Cartesian product, due to the correlations. Also, unlike a Cartesian product, the Apply operator can return an outer row even if the inner input is empty.

The Apply operator takes an outer relational inputs and an inner relational expression. Additionally, it contains a join predicate, and possibly a passthrough predicate. A join predicate is a condition that requires reference to both the outer relation and inner expression or its resolution.

A passthrough predicate is a condition with no dependencies on the inner expression. For each outer row, the passthrough predicate is evaluated; if true, the row is output to the consumer without executing the inner expressions. Columns whose values are based on the inner table are set to null. This is useful to short-circuit evaluation of an OR, for example. If a row satisfies an earlier condition, there is no need to evaluate further. Passthrough predicates are also used to avoid executing code that was conditional in the original SQL source using the Case When statement discussed further below.

The output of the Apply operator is the outer relational inputs with two possible new columns. For each outer row, a passthrough column contains the boolean result of the evaluation of the passthrough predicate. Also for each outer row, if the result of the inner expression is non-empty, then a probe column is set to TRUE; otherwise it is set to FALSE.

The exemplary embodiment of the invention employs a conversion algorithm of the following form to remove all subqueries. Take a scalar expression with subqueries, say e, which is to be evaluated for each row of some relation R. For each subquery Si that is used in e, create a new variable vi. Construct a new scalar expression e', by replacing each subquery with its corresponding variable vi; such e' does not contain subqueries. Now, add Apply operators on top of the source relation R, in a way that each Apply computes the result of the new variables vi, added as a new column; call the new relation R'.

Figure 3A:
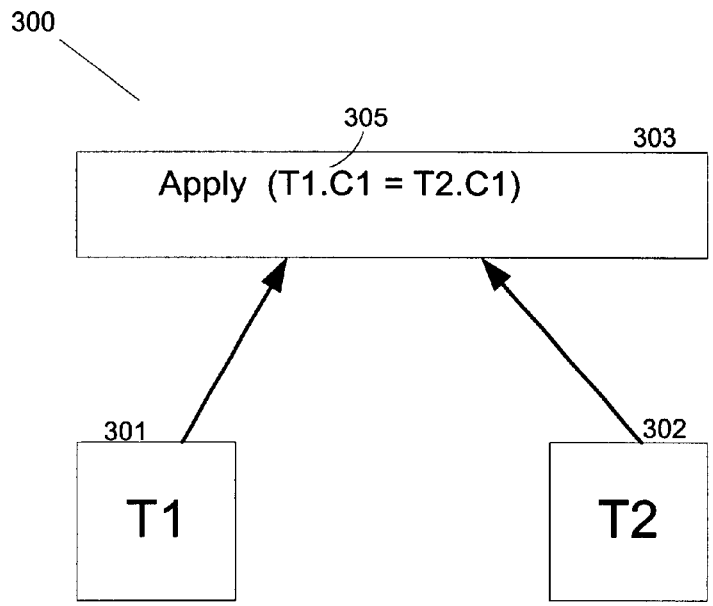
FIGS. 3A–C are diagrams illustrating the SQL subqueries of FIGS. 2B–D converted in accordance with an exemplary embodiment of the invention.
Figure 3B:
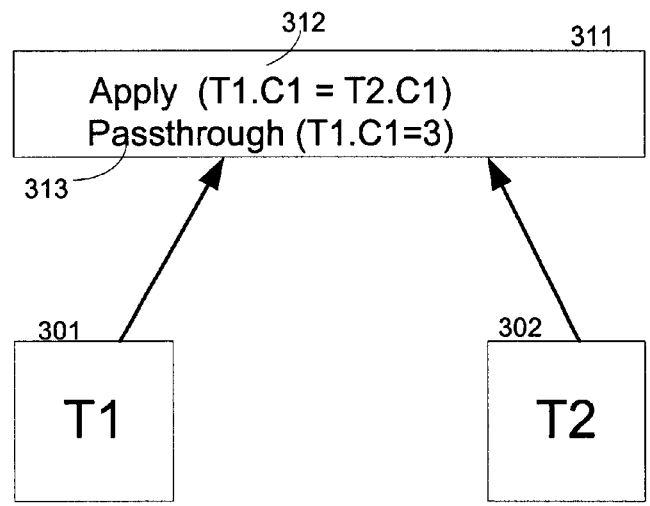
Figure 3C:
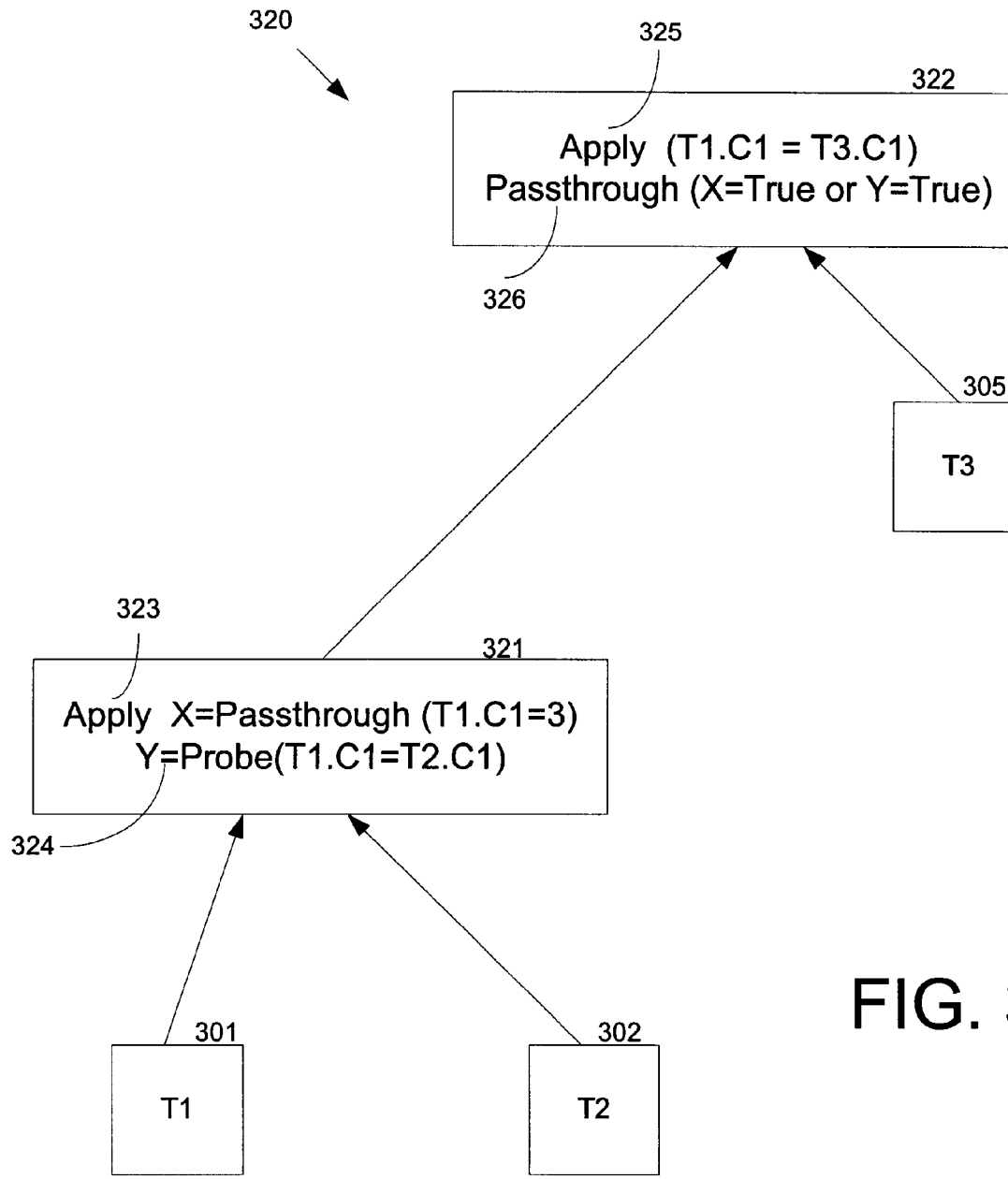

Turning to FIGS. 3A–C, the execution of the Apply operator, and hence the converted subquery, by the exemplary embodiment of the invention. is now described. The Apply operators substituted for the subqueries in the earlier example queries q2, q3, and q4 are represented as operator trees 300, 310 and 320, respectively. The use of an operator tree to illustrate an SQL query is well-known in the art and is therefore the mechanics of the structure itself is not discussed separately.

In general, the exemplary embodiment of the invention converts a scalar operator tree that represents a query having subqueries into a "linear" sequence of operators, each computing the result of one of the subqueries; at the top is a scalar expression on the subquery values. In the examples that follow, each expression containing a subquery has been converted into an appropriate version of the Apply operator. The following examples use the queries q2, q3 and q4 from above and are assumed to operate on the tables shown in FIGS. 2A–D.

Beginning with query q2, an Apply operator 303 with a join predicate 305 has been substituted for the expression "Exists (Select * from T2 where T1.C1=T2.C1)" in FIG. 3A. The join predicate operates to restrict the output of the Apply operator 303 to only those rows of T1 301 which satisfy the condition "T1.C1=T2.C1." Assuming that table T1 301 is the same as table T1 200 and given the operator tree shown in 3A, the output of the Apply operator is a relation having two rows: 4 and 8. There is no need to append a probe column to T1 (as shown in FIG. 2B) to hold the evaluation of the expression because the Apply operator 300 is the highest relational operator in the tree, i.e., no other operator "consumes" the output from the Apply operator 300. All rows that do not satisfy the expression are discarded.

As shown in FIG. 3B for query q2, adding the condition "T1.C1=3" to the query introduces a passthrough predicate 313 to the Apply operator. As each row in T1 301 is read, if it satisfies the passthrough predicate 313, it is immediately output to the consumer. As was the case with query q2, the consumer is not another relational operator and so neither a probe column nor a passthrough column is required.

Figure 2C:
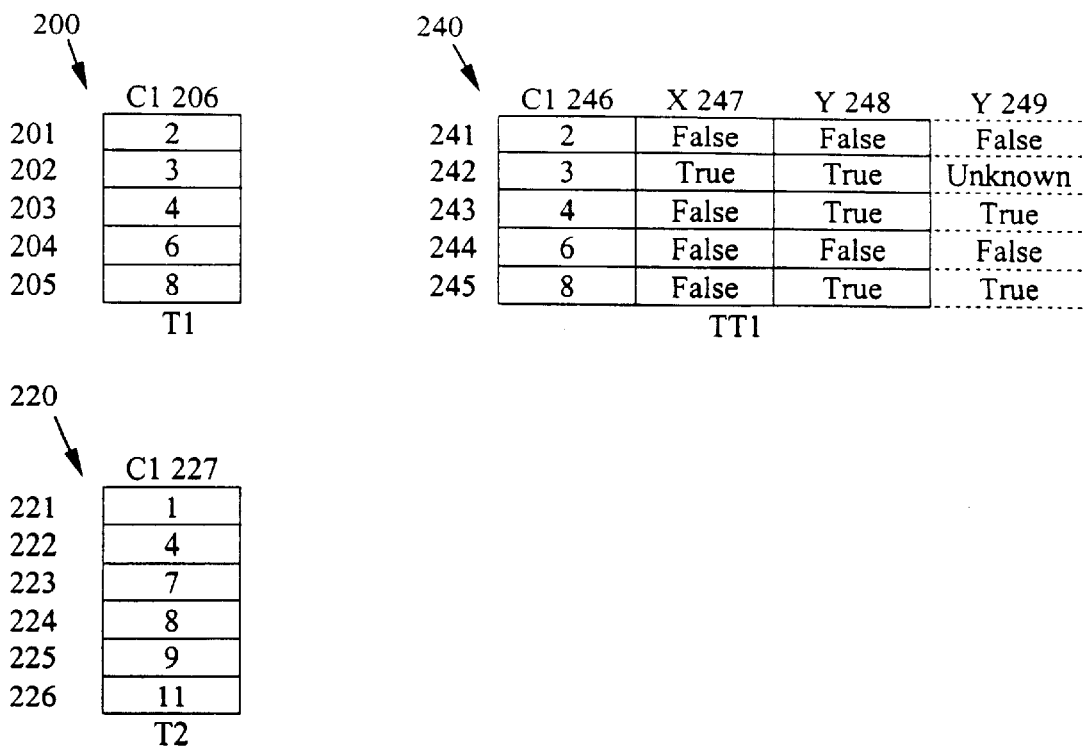
Figure 2D:
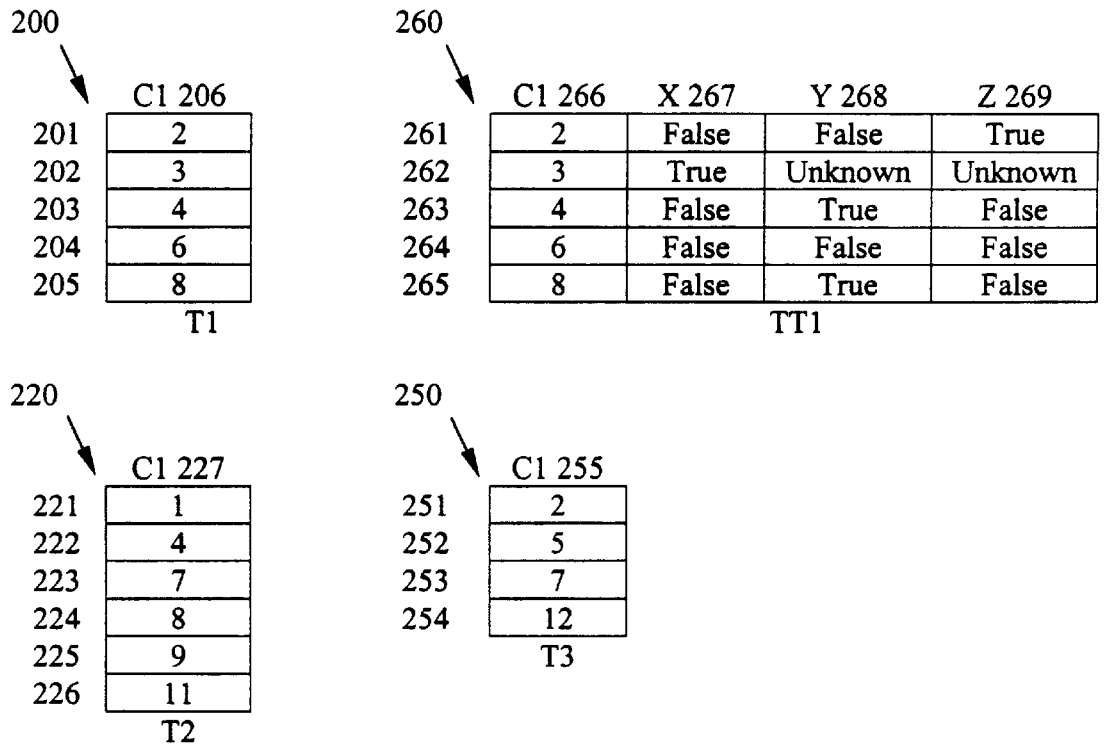

In contrast for the query q4, the output of Apply operator 321 in FIG. 3C is consumed by another relational operator, the Apply operator 322. Therefore, the Apply operator 321 appends a passthrough column X 323 and a probe column Y 324 to the rows in table T1 301, producing the temporary table TT1 240 (FIG. 2C). The temporary table TT1 240 is consumed by the Apply operator 322. The passthrough predicate 326 causes the Apply operator 322 to output the rows in TT1 240 that contain a True value in either the passthrough column X 323 or the probe column Y 324. The Apply operator 322 uses its join predicate 325 to determine if any other rows should be output. Note, that if the output of the Apply operator 322 was consumed by another relational operator, the Apply operator 322 would append a probe Z column to the output, resulting in the temporary table TT1 260 shown in FIG. 2D.

Context Indications

The context of a relational execution captures the intended utilization of a value in the arrangement of the tree of operators that process the relational inputs. As described above, the context of the subquery can change the type of conversion that is required for the subquery, so converting the same subquery in different contexts results in different properties for the Apply operators. The exemplary embodiment of invention provides for context interpretation through an input to the conversion algorithm. The context interpretation variable I takes three values:

Select: Rows in R for which e evaluates to FALSE or UNKNOWN will be rejected;

Select-value: FALSE and UNKNOWN are interchangeable results, in the context of the expression; and Value: Returns the exact value of the subquery.

The evaluation of any converted e' on R' under interpretation I should be the same as that of e evaluated on R.

Figure 4A:
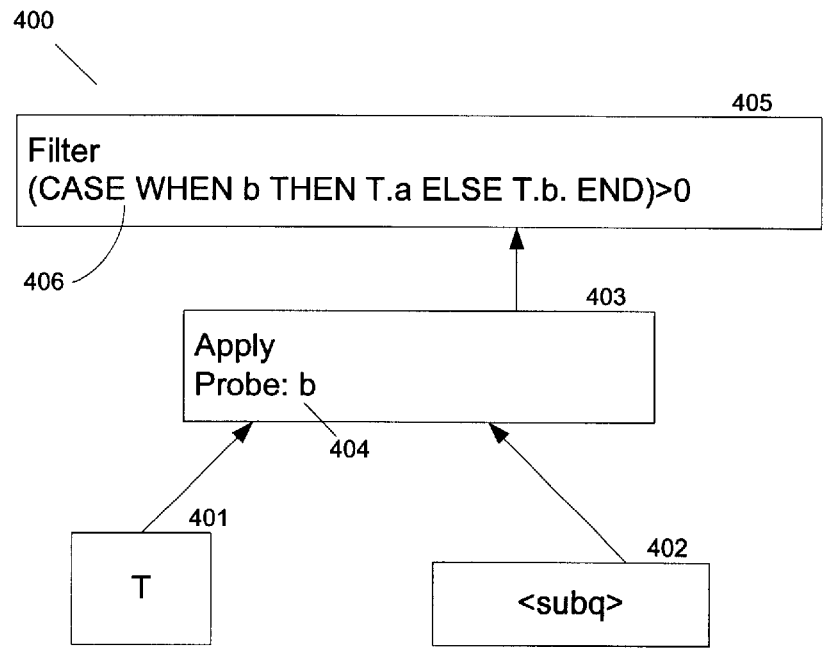
FIGS. 4A–C are diagrams illustrating different contexts for an SQL subquery in accordance with an exemplary embodiment of the invention.
Figure 4B:
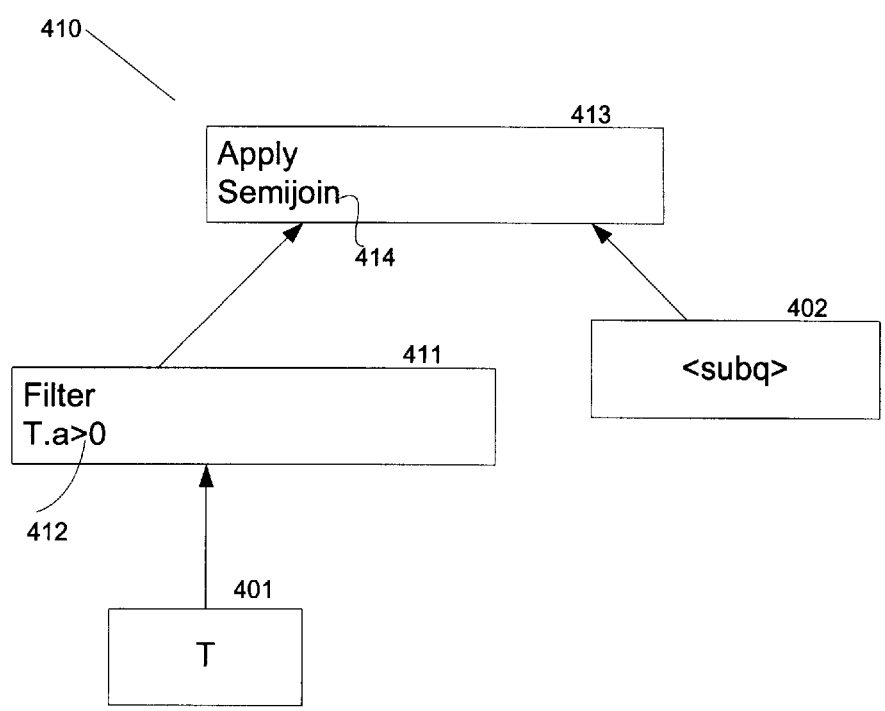

FIGS. 4A–B illustrate two different operator trees 400, 410 containing the same subquery, <Subq>, in two different contexts. FIG. 4A illustrates the Apply operator 403 appropriate for the query:

(q5) Select * from T where (Case When Exists(<Subq>) Then T.a Else T.b End)>0.

The context of the subquery in query q5 requires that the result of the subquery be placed in a boolean variable, and that FALSE be treated the same as NULL or UNKNOWN. Therefore, when executing the q5 subquery, for each row in T, a new column b 404 will added to the result of the subquery for consumption by the relational operator filter 405. In this case, the value of the context indication I passed to the conversion algorithm for the subquery is Select-Value.

In contrast, FIG. 4B illustrates the Apply operator 413 appropriate when the context of the same subquery requires that rows be rejected if the subquery is FALSE or NULL, as in the following query:

(q6) Select * from T where Exists(<Subq>) AND T.a>0.

In this instance, the Apply operator 413 does not introduce a new column but discards rows using a semijoin function 414 (which tests for non-empty inner input) because no other relational operator consumes its output. Therefore, the value of the context indication I passed to the conversion algorithm is Select.

The context interpretation values for different relational operators depending on their usage context is described in more detail in the next section.

A special case of context interpretation concerns conditional expressions. As previously discussed, the general idea for subquery removal is to replace each subquery by a new variable, which is computed lower down in the operator tree. A straightforward implementation of this idea can introduce errors when conditional expressions are used. For example, take the following expression:

Case When T.a=5 Then <Subq1> Else <Subq2> End.

As stated, the semantics of the query is, if T.a=5 then execute <subq1> and return the result; otherwise execute <subq2> and return the result. That is, if T.a=5 the original expression does not execute <subq2>. This type of conditional expression can be used to avoid run time errors, for example the following expression avoids a division by zero:

Case When T.a<>0 Then T.a/T.a Else 0.

Figure 4C:
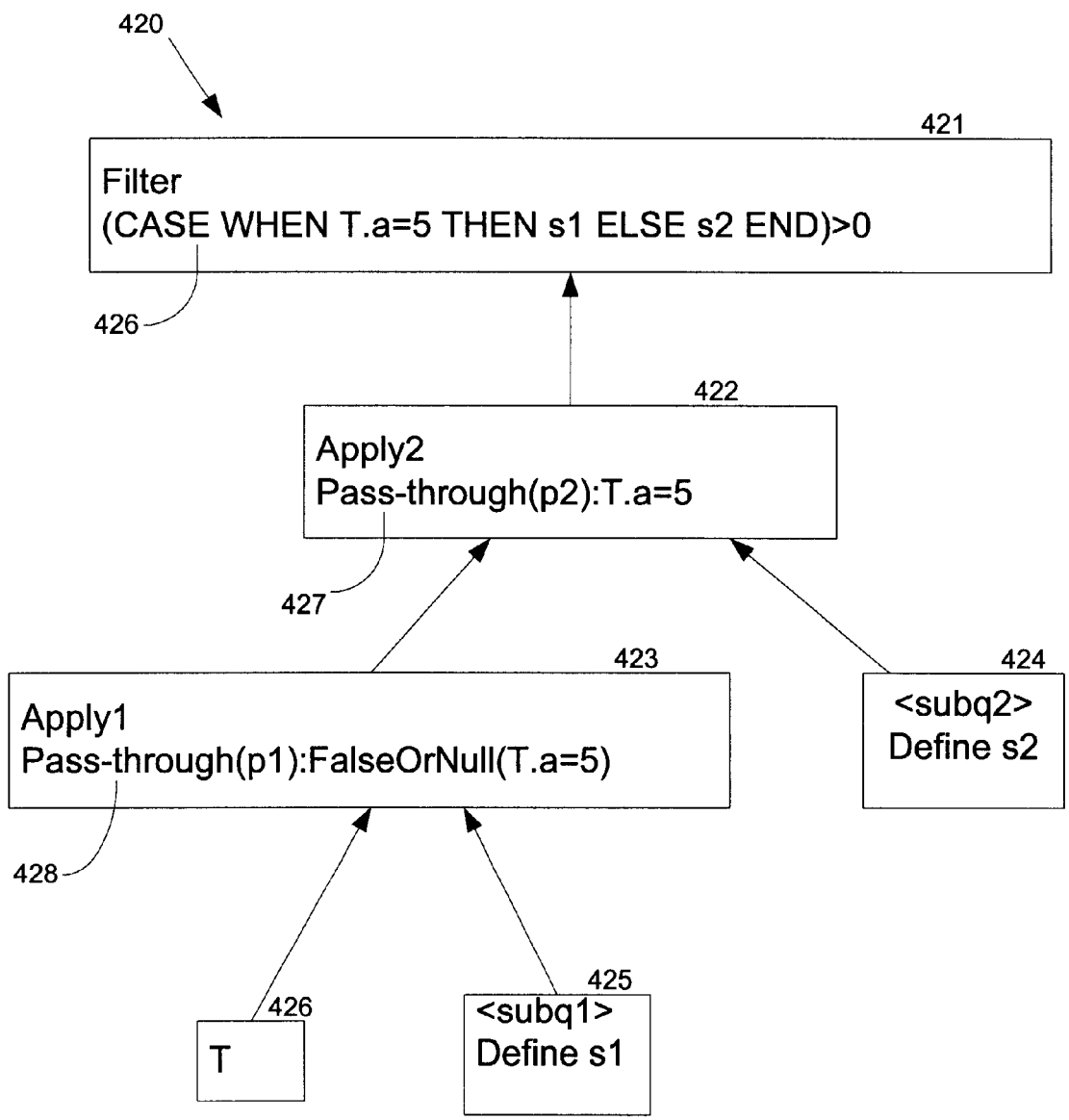

If a new variable is introduced and always computed for conditional subqueries, the run-time error that the conditional computation was explicitly trying to avoid can occur. In this case, the pass-through predicate provides the mechanism for a correct translation. For the expression above, the operator tree 420 shown in FIG. 4C is generated in which only the applicable subqueries are executed. The operator tree 420 represents the query:

(q7) Select * from T Where (Case When T.a=5 Then <Subq1> Else <Subq2> End)>0.

Assuming that T.a=5 is true for some row, the passthrough predicate of Apply2 422 is true, and therefore <subq2> 424 is not executed for such row, which implements the correct semantics of the Case When expressions. The conversion algorithm substitutes the scalar operator IFF(cond, val-on-true, val-on-false) for the SQL construct Case When and inserts the passthrough predicates in the appropriate places.

Parameter Sensitive Operator Lists & Re-Compute Sets

The Apply operator utilizes a parameter sensitive operator list during execution of the query. This list maintains the dependency or correlation between operators in the inner expression (also called the "inner input") and individual column names from the outer stream. For any column a in the outer stream, the list indicates which operators in the inner expression have a result that depends on the value of such column a. One exemplary embodiment of a sensitive operator list data structure is shown in FIG. 10 and described in detail in the fourth section.

The sensitive operator list for a parameter is used to determine which operators must re-compute their output when the value of the parameter changes. Those operators form a re-compute set. An exemplary embodiment of a re-compute set data structure is shown in FIG. 11 and described in detail in the fourth section.

The exemplary embodiment of the invention computes a sensitive operator list for each correlated parameter by determining a set of values from the outer relational input that are referenced on the inner relational input, previously referred to as correlation parameters, since they are treated as parameters in the inner expression. A set of operators on the inner relation that are sensitive to changes in each correlated parameter becomes the sensitive operator list for that parameter.

An operator is said to be sensitive to changes in a correlated parameter if a change in the value of that correlated parameter may cause the operator to produce different output. Conversely, an operator is said to be insensitive to changes in a correlated value if it is guaranteed to produce the same output regardless of the actual value of that correlated parameter. For example, if a filter operator has a reference to the parameter in its filter predicate, that filter is sensitive. Once an operator is determined to be sensitive to a parameter, all operators that consume its output are dependent as well. For example, if a sort operator consumes the output from that filter, that sort operator is dependent as well. Note that if a join consumes the output of that filter, the join is sensitive, but the other input of that join need not be since that input does not consume the filter output.

The use of a sensitive operator list during execution is described in conjunction with a the query:

(q7) Select * from T2 where Exists(Select * from T2 where T2.C1=T1.C1 Union All Select * from T3 where T3.C2=T.C2).

Figure 5:
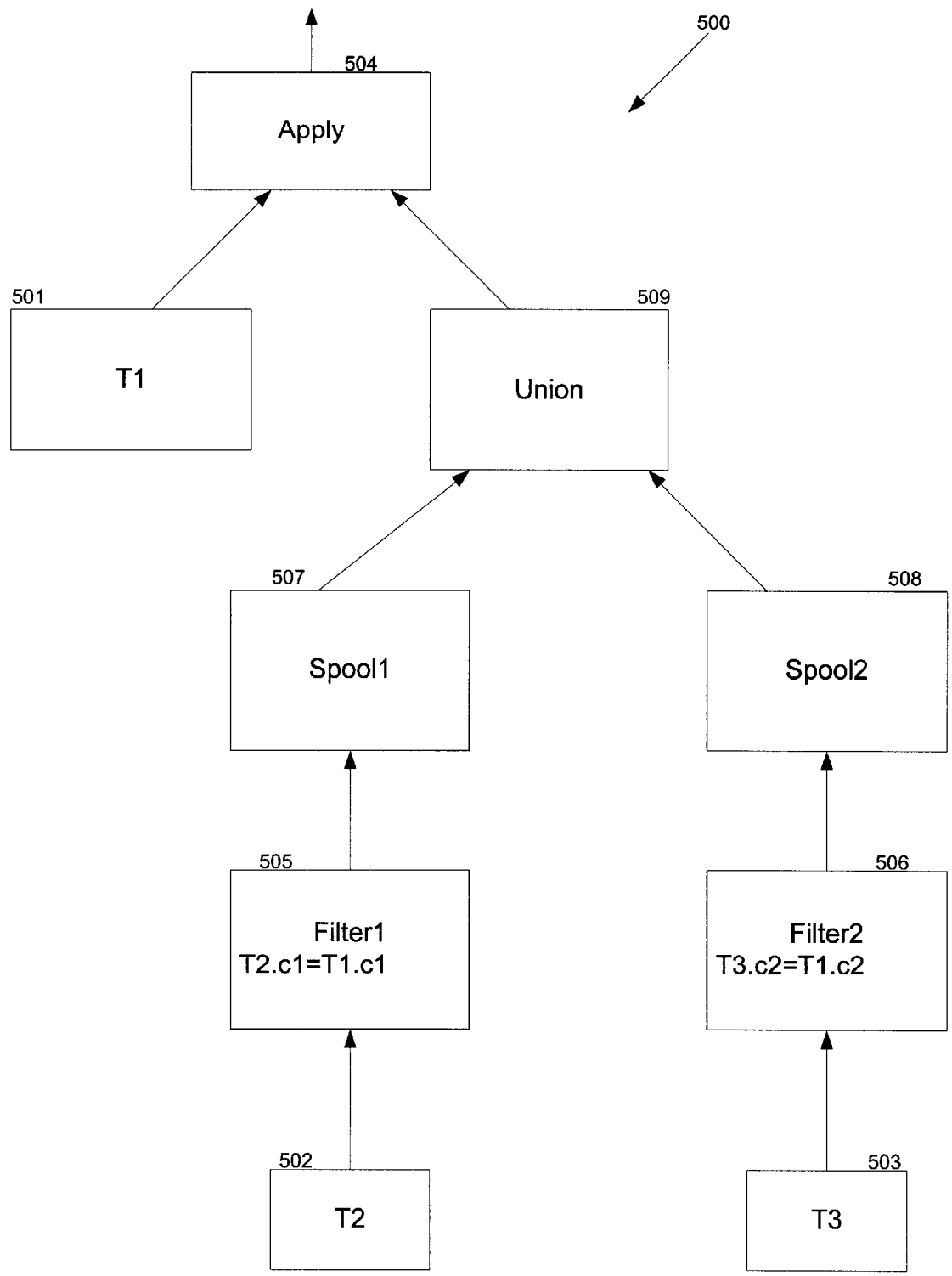
FIG. 5 is a diagram illustrating a rewind feature of an exemplary embodiment of the invention.

The converted query is shown as an operator tree 500 in FIG. 5.

The operator tree 500 contains three tables T1 501, T2 502, and T3 503, an Apply operator 504, and a Union operator 509. Table T1 501 contains two columns, T1.c1 and T1.c2; T2 502 contains one column, T2.c1; and T3 503 contains two columns, T3.c1 and T3.c2. For each row scanned in T1 501, rows from T2 502 are filtered through a Filter1 operator 505 and buffered by a Spool1 operator 507. Similarly, rows from T3 503 are filtered through a Filter2 operator 506 and buffered by a Spool2 operator 508 for each T1 row. T1.c1 and T1.c2 are correlated parameters for the query represented in FIG. 5 because they are each referenced by the inner expression side of the Apply operator, e.g. the Filter1 operator 505 references T1.c1, and the Filter2 operator 503 references T1.c2.

For T1.c1, the sensitive operator list contains the Filter1 operator 503 (since it references T1.c1), the Spool1 operator 507 (since it consumes output from the Filter1 operator 503), and the Union operator 509 (since it consumes output from the Spool1 operator 507). For T1.c2, the sensitive operator list contains the Filter2 operator 506 (since it references T1.c2), the Spool2 operator 508, and the Union operator 509.

At run-time, each time the Apply operator 504 reads a new row from T1 501, it "resets" the inner input that depends on T1 parameters. The Apply operator checks to see if T1.c1 and/or T1.c2 have changed from the previous time a row was read from T1. Assuming that neither parameter has changed, the Apply operator 504 performs a "rewind" command to reuse the data buffered by the Spool1 507 and Spool2 508 operators since it will be producing the exact output it produced the last time it was read, thus saving the processing time required to re-compute the same values.

On the other hand, if the value of T1.c1 has changed, all operators on the T1.c1 sensitive operator list are added to a re-compute set because as those operators will need to re-compute their output. In this instance, the Filter1 505, Spool1 507, and Union 509 operators make up the re-compute set. When the Reset call is made to the inner side of the Apply operator 504, the Spool1 operator 507 recognizes that it is included in the re-compute set (because it was included in the sensitive operator list for T1.c1), discards discard its buffered data and re-scans T2 502 to determine the rows which now satisfy T2.c1=T1.c1.

Assuming that both T1.c1 and T1.c2 have changed, then all operators on either the T1.c1 or T1.c2 sensitive operator list make up the re-compute set, i.e., the Filter1 505, Spool1 507, Union 509, Filter2 506, and Spool2 508 operators. When the Reset call is made to the inner side of the Apply operator 504, the Spool1 505 and Spool2 506 operators both recognize that they are included in the re-compute set, so both discard their buffered data and re-scan their respective inputs.

One of skill in the art will understand that the Rewind/Reset feature of the invention is not limited to use with only spool operators as shown in FIG. 5, but is applicable to any caching node. A caching node, such as a spool or sort, buffers its output data for consumption by an operator higher in the operator tree. Caching nodes, are located in the operator tree at points determined by weighing the number of rows in the outer stream, the expected amount of data to cache, and the number of distinct values of the parameters. Likely candidate locations include the root node of the inner expression of an Apply operator or near the root of the operator tree. The use of alternate costing algorithms to define caching node placement will be readily apparent to one skilled in the art.

The system level overview of the operation of an exemplary embodiment of the invention has been described in this section of the detailed description. SQL subqueries are evaluated and converted by the invention into a special relational operator having properties based on the context of the subquery. The special relational operator tracks the relationship between various parameters in its expression and reuses previously processed output when appropriate. While the invention is not limited to any particular size relational database, for sake of clarity a simplified three table database has been described in explaining the invention.

Methods of an Exemplary Embodiment of the Invention

In the previous section, a system level overview of the operation of an exemplary embodiment of the invention was described. In this section, the particular methods performed by a computer, such as client computer 20 or server computer 49, executing such an exemplary embodiment are described by reference to a series of flowcharts. The methods to be performed constitute computer programs made up of computer-executable instructions. Describing the methods by reference to a flowchart enables one skilled in the art to develop such programs including such instructions to carry out the methods on suitable computerized clients and/or server (the processor of the clients/servers executing the instructions from computer-readable media).

The exemplary embodiment of the invention is described in this section with reference to two software processes, one for conversion and one for execution. Variations on these two basic processes will be immediately apparent to one skilled in the art and are considered within the scope of the invention. Specific alternate embodiments are discussed in the next section.

Conversion

Figure 6:
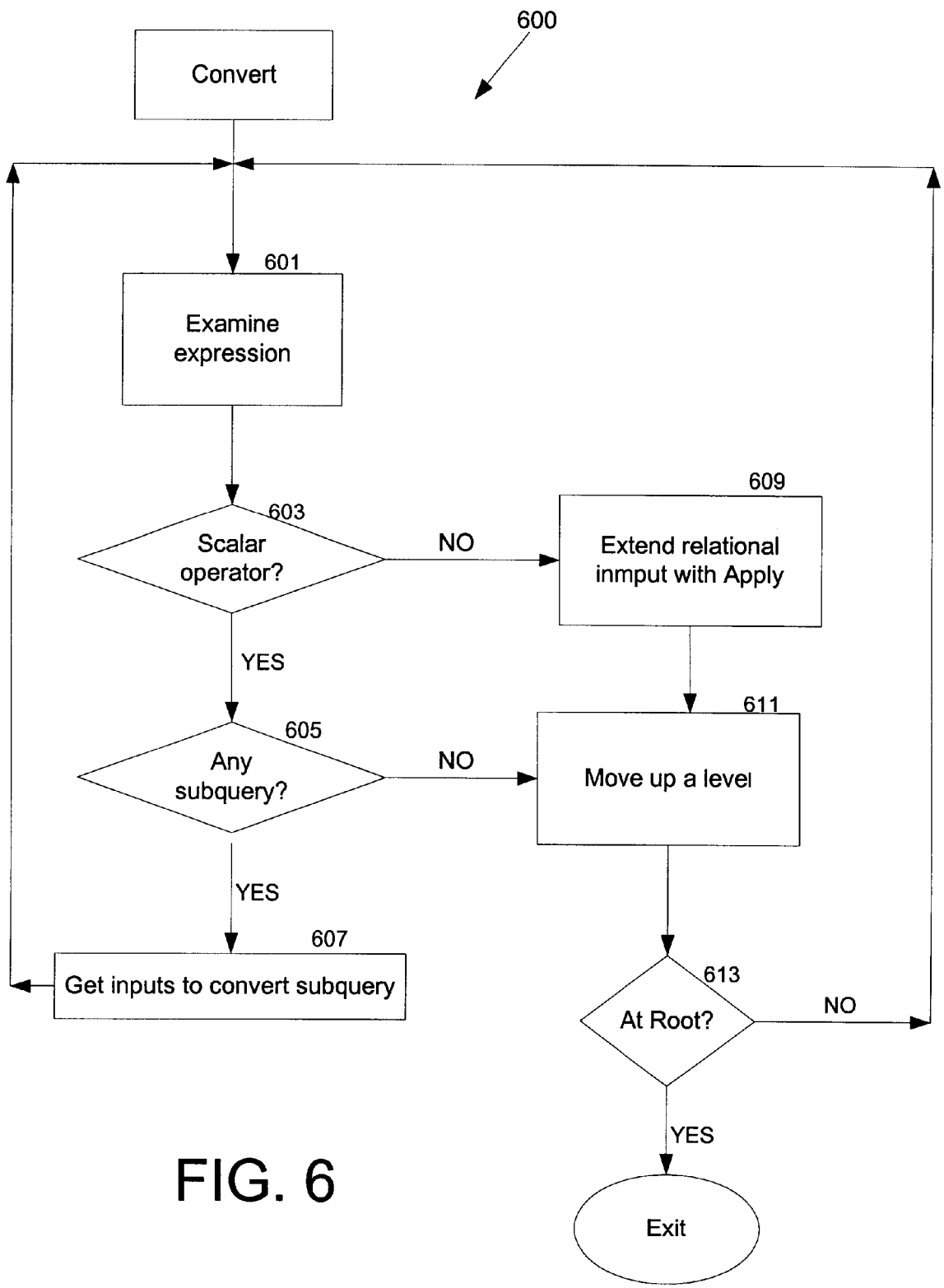
FIG. 6 is a flowchart of a method to be performed by a computer according to an exemplary embodiment of the invention in converting SQL subqueries.

Referring first to FIG. 6, a flowchart of a method to be performed by a computer when converting subqueries according to an exemplary embodiment of the invention is shown. This method is inclusive of the acts required to be taken by a recursive conversion algorithm to remove subqueries from scalar expressions as described in the previous section.

The query is traversed to determine if any of its relational operators require conversion. The conversion algorithm is called for each relational operator that references at least one scalar expression e, which contains a subquery "subq" in a specific context. The expression defines an operator tree that is rooted by the relational operator. The conversion algorithm is called with the relation R referenced by the expression, the expression e, and the context interpretation value I as shown in the "Convert (R, e, I)" column in Table 1 below for the particular type of root operator.

The conversion algorithm examines the expression e (block 601) to determine if it is a scalar operator (block 603). A scalar operator that has subqueries below it in its operator tree (block 605) is converted by calling the conversion algorithm with the inputs appropriate to the type of operator (referring to Table 3) at block 607.

If the expression is not a scalar operator (block 603), the relational input is extended by creating an Apply operator with the input relation R as its outer input and a constant or variable representing the subquery as its inner input (block 609). The specifics of the Apply operator tree created depends on the type of expression and the input value of the context interpretation variable I (referring to Table 2).

The conversion algorithm recursively progresses down through the current branch of the operator tree until a scalar operator which has no subqueries is found or a subquery in the expression has been replaced by a constant or variable. The conversion algorithm moves up a level in the tree (block 611) and recursively progresses down through the next branch of the tree. The conversion algorithm is complete once the all the branches of the current operator tree have been converted, i.e., the root of the operator tree is reached (block 613).

Relational Operators With Scalar Expressions

Table 1 contains the rules to convert relational operators. The appropriate R, e and I are input to the conversion routine which returns the output listed. The original operator and expression is replaced as shown.

A left semijoin function is used to test for non-empty inner input, i.e., "True" if there is a match. A left antisemijoin function tests for empty inner input.

TABLE 1

| Operator | Convert(R,e,I) | Output | Replacement |
|---|---|---|---|
| Select(R, exp) | R, exp,select | NewR,NewE = True | NewR |
| Join, Left-outer/ semi/anti join of R1,R2, on exp | R2, exp,select | NewR2,NewE = True | Apply[original join type] (R1,NewR2). |
| Full outerjoin (R1,R2, exp) | R1, exp,select R2, exp,select | NewR1,NewE1 = True NewR2,NewE2 = True | UnionAll(Apply[Left outerjoin](R1,NewR2), Apply[Right antisemijoin] (R2,NewR1)) |
| Project(R, exp) | R, exp,value | NewR,NewE | Project(NewR,NewE) |
| GbAgg(R, exp) | R, exp,value | NewR,NewE | GbAgg(NewR,NewE) |
| Update(R, exp,cnst) | R, exp,value | NewR,NewE | Update(NewR,NewE,cnst) |
| Insert(R, exp,cnst) | R, exp,value | NewR,NewE | Insert(NewR,NewE,cnst) |

Expressions with Subqueries

The rules for converting each type of expression which can contain a subquery as shown in Table 2. This is part of the recursive conversion procedure described above, and each of these rules removes one subquery. Subquery removal may be needed on the expressions generated. Subqueries of the form <expr>IN<subq> are rewritten as <expr>=SOME<subq>; <expr>NOT IN<subq> as <expr><>ALL<subq>. For an inner join, the inner input always produces one row, with one column, which is then appended to the outer row.

TABLE 2

| e | I | R' | e' | Notes |
|---|---|---|---|---|
| EXISTS(subq) | select | Apply[left semijoin] (R, subq) | True | |
| | select-value or value | Apply[left semijoin, probe b] (R, subq) | b | |
| NOT EXISTS(subq) | select | Apply[left antisemijoin] (R, subq) | True | |
| | select-value or value | Apply[left semijoin, probe b] (R, subq). | not b | |
| <expr> <cmp> SOME(subq) | select | Apply[left semijoin] (R, R1) | True | 1 |
| | select-value | Apply[left semijoin, probe b] (R, R1) | b | |
| | value | Apply[innerjoin] (R, R2) | b | |
| <expr> <cmp> ALL(subq) | select | Apply[left antisemijoin] (R, R1) | True | 2 |
| | select-value | Apply[left semijoin, probe b] (R, R1) | not b | |
| | value | Apply[innerjoin] (R, R2) | b | |
| (subq) Subquery used as a scalar, i.e., produces one row with one | select-value or select value | Error | Error | 3 |
| | | subquery[left outerjoin] (R, Check- | A | 4 |

TABLE 2-continued

| e | I | R' | e' | Notes |
|---|---|---|---|---|
| column | | Max-One(subq)); NULL = subquery is empty | | |

Notes for Table 2
1: A = column projected by the subquery; R1 = select * from subq where <expr> <cmp> a; R2 = select Agg-OR (<expr> <cmp> a) as b from subq; Agg-OR is a new aggregate operator for three-valued disjunctions
2: A = column projected by the subquery; R1 = select * from subq where sFalseOrNULL (<expr> <cmp> a); R = select Agg-AND (<expr> <cmp> a) as b from subq; Agg-AND is a new aggregate operator for three-valued conjunctions
3: Cannot project boolean columns in SQL
4: A = column projected by the subquery; if the subq relational expression has a max provable cardinality of 1 (e. g. the root is an aggregate without group by) then there is no need to check Max-One. Further note that the Max-One flag specifies the constraint that there must be at most one match on the inner table. This is used for scalar-valued subqueries, which must return a result of at most one-row, with one-column. The one-4 column part is checked by the parser/binder; the one-row result is in general checked by the nested loops execution. If the constraint is violated, the query must be aborted.

Scalar Operators

There is no need to modify a scalar operator unless there are subqueries below it. Passthrough predicates are pushed down at the point of generation to the lowest level of the current branch of the operator tree. If there were other passthrough predicates from above, they must be OR'd together with the new ones.

The match predicate p contains no subqueries and represents the bottom of the current operator tree branch.

TABLE 3

| e | I | R' | e' | Notes |
|---|---|---|---|---|
| AND(exp1, exp2) | select | NewR2 | True | 1 |
|  | select-value | NewR2 | NewE1 AND NewE2 | 2 |
|  | value | NewR2 | NewE1 AND NewE2 | 3 |
| OR(exp1, exp2) | select | NewR2 | True | 4, 5 |
|  | select-value | NewR2 | NewE1 OR NewE2 | 6, 5 |
|  | value | NewR2 | NewE1 OR NewE2 | 7, 5 |
| NOT(exp1) | all | NewR1 | NOT(NewE1) | 8 |
| IIF(exp1, exp2, exp3) | select or select-value | Error | Error | 9 |
|  | value | NewR3 | IIF(NewE1, NewE2, NewE3) | 10 |
| Op(exp1, . . . , expN) arbitrary operators, convert down. | select or select-value | Error | Error | 9 |
|  | value | NewRN | Op(NewE1, . . . , NewEN). | 11 |
| p contains no subqueries | select | Select(R, e) | True | |
|  | select-value or value | R | e | |

Notes for Table 3
1: Recursively convert (R, exp1,select) to get (NewR1, NewE1 = True); recursively convert (NewR1, exp2,select) to get (NewR2, NewE2 = True).
2: Recursively convert (R, exp1,select-value) to get (NewR1, NewE1); recursively convert (NewR1, exp2,select-value,FalseOrNull(NewE1)), where FalseOrNull(NewE1) is a passthrough predicate, to get (NewR2,NewE2).
3: Same as 2, but use "value" instead of "select-value" in the recursive call.
4: Recursively convert (R, exp1,select-value) to get (NewR1, NewE1); recursively convert (NewR1, exp2,select,NewE1) to get (NewR2,NewE2 = True).
5: Rows cannot be discarded for failing exp1; when I = select, rows can be discarded if both expressions fail.
6: Recursively convert (R, exp1,select-value) to get (NewR1, NewE1); recursively convert (NewR1, exp2,select-value,NewE1) to get (NewR2, NewE2).
7: Same as 6, but use "value" instead of "select-value" in the recursive call.
8: Recursively convert (R, exp1, value) to get (NewR1, NewE1).
9: Cannot project boolean columns in SQL.
10: Recursively convert (R, exp1,select-value) to get (NewR1, NewE1); recursively convert (NewR1, exp2,value,FalseOrNull(NewE1)) to get (NewR2, NewE2); recursively convert (NewR1, exp2,value,NewE1) to get (NewR3, NewE3).
11: Recursively convert (R, exp1,select-value) to get NewR1, NewE1); feed result of conversion all the way to the end, until convert(NewRn-1, exp2,value) results in (NewRN, NewEN)

Execution

Figure 7A:
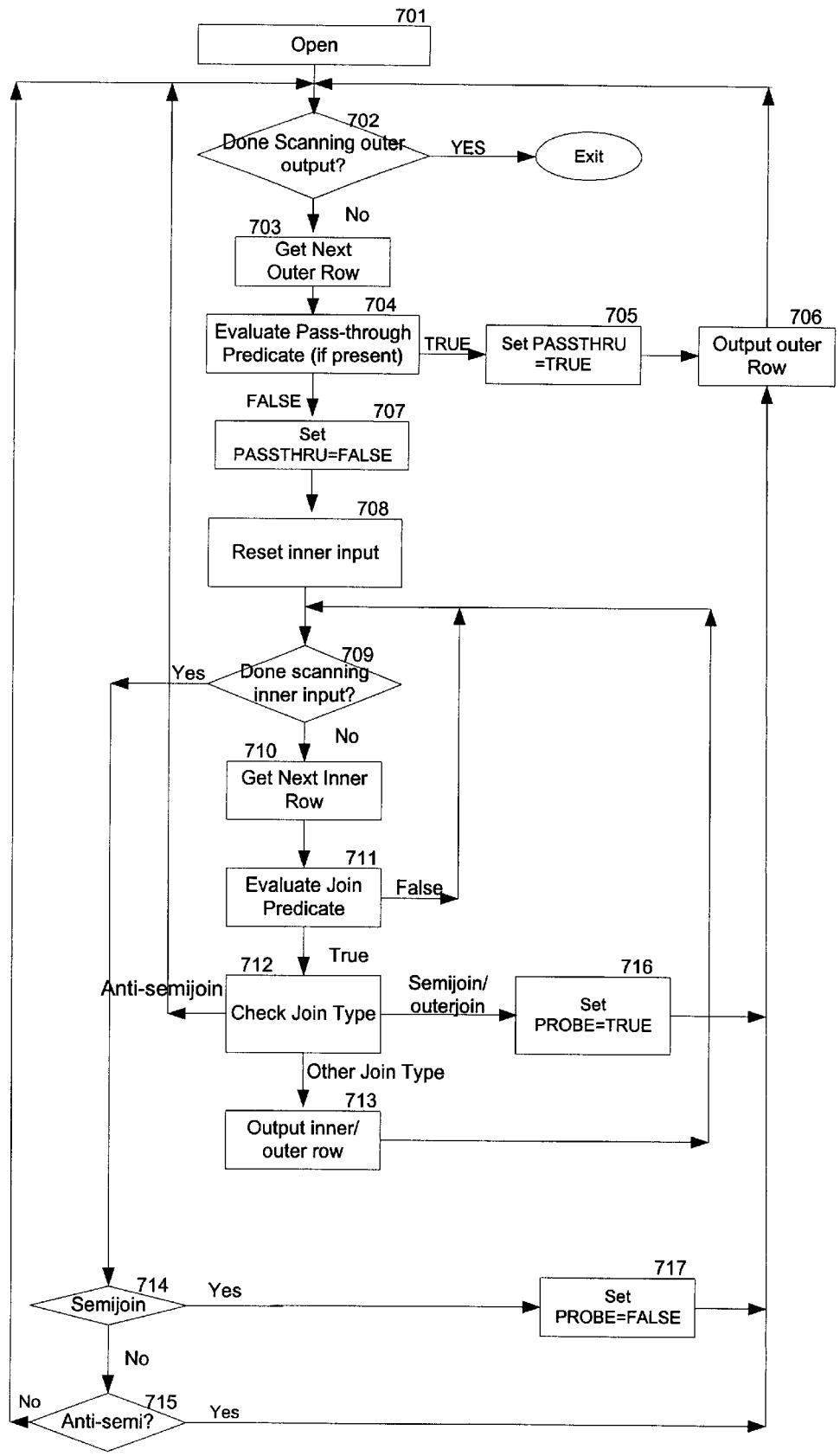
FIGS. 7A–B is a flowchart of a method to be performed by a computer according to an exemplary embodiment of the invention in executing SQL subqueries.
Figure 7B:
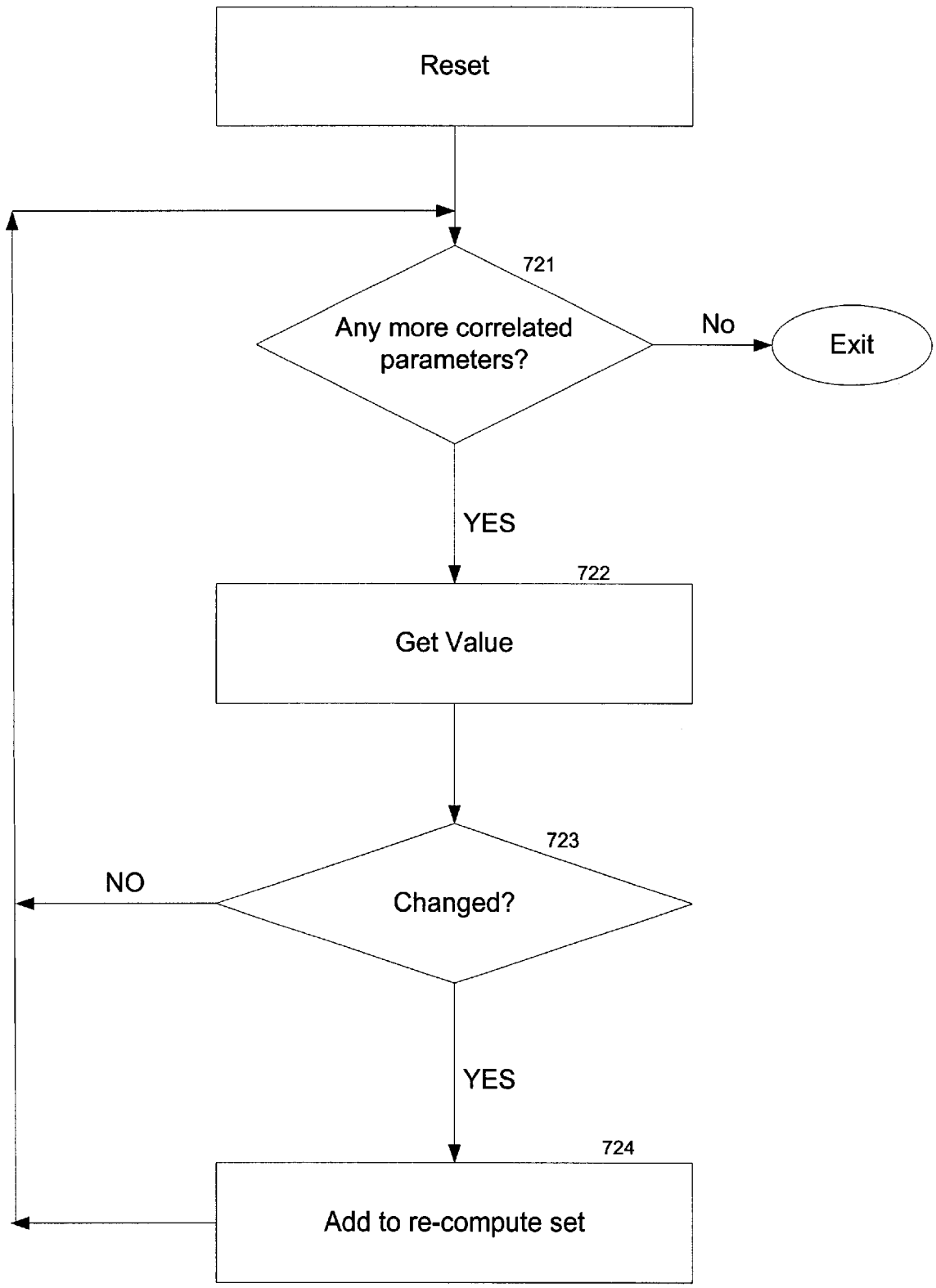

Turning now to FIGS. 7A–B, a flowchart of a method to be performed by a computer when executing the converted subqueries according to an exemplary embodiment of the invention is shown. This method is inclusive of the acts required to be taken by an Apply operator.

During query execution time, the Apply operator begins by getting a row from its outer relational input (block 703). If a passthrough predicate is present, it is evaluated against this row (block 704). If the passthrough predicate is satisfied, the row is output by the Apply operator without touching the inner input (block 706). If the passthrough predicate is not satisfied, the inner input is reset (block 708; details in FIG. 7B).

After resetting the inner input, this input is scanned (block 710). Each row that the Apply operator reads from the inner input is passed into the join predicate and evaluated (block 711). If the result of this predicate evaluation satisfies this join type at block 712 (in the case of an inner join, this would mean that the outer/inner row combination satisfies the join predicate), the inner row is considered a "match" and the outer/inner row combination is output by the Apply operator (block 713). If the result of the predicate evaluation does not satisfy this join type, the inner row is considered a "non-match", and is released.

The Apply operator repeats the process by reading the next row from its inner input (block 711). This process continues until the inner input has been fully scanned (block 709). If there were no matches to the outer row, and the join type is such that non-matching outer rows should be output at blocks 714 or 715 (as in the case of a left-anti-semi join), the outer row is then output (block 706). At this point, the Apply operator gets the next row from the outer input (block 703), and this process is repeated until all outer rows have been read (block 702). When all the outer rows have been read, the Apply operator has produced all its output and the operation is complete.

If the Apply operator needs to support a probe column, the behavior of the join type check (block 712) is modified. An additional boolean value is included in the row, containing the value TRUE if a matching row was found (block 716) and FALSE (block 717) if no matching row was found. All outer rows, including those that do not have a matching inner row are output. For a left semijoin, the Apply operator returns all of the semijoin with a probe column of True, plus all of the antisemijoin with a probe column of False. Note that for a left outerjoin, the match information cannot be gathered from the output of the outerjoin alone. If there is a row with all-null values in the right-input columns, it is ambiguous whether the nulls are there because there was no match for the outer row, or because there was a matching all-null row in the inner input. So a probe column resolves the ambiguity by explicitly indicating whether or not there was a match.

If the Apply operator uses a passthrough predicate, an additional boolean value is included in the row, in the form of a passthrough column, containing the result of the passthrough expression (blocks 705 or 707).

The details of the reset process represented by block 708 are now explained in detail in conjunction with FIG. 7B.

When the Apply operator gets a new outer row and resets its inner input, the Apply operator checks the state of each correlated parameter (block 722). If the value of a correlated parameter has changed (block 723), the Apply operator references the sensitive operator lists to add the appropriate operator(s) to the current re-compute set (block 724). When all the correlated parameters has been checked, the re-compute set is passed to the inner input during the Reset call for processing by each of the operators in the inner expression as described above in the overview section.

If none of the values of any of the correlated parameters has changed, no re-compute set has been created at block 724 to be passed on the Reset call, so the Apply operator simply Rewinds its inner input upon reset. Since no parameter values have changed, the inner input will be producing exactly the same output that it produced the previous time it was read. Any cached results can be reused and do not need to be re-computed.

The particular methods performed by client or server computer executing an exemplary embodiment of the invention have been described. The method performed to convert subqueries has been shown by reference to a flowchart including all the steps from 601 until 613. The method performed to execute the converted subqueries has been shown by reference to a flowchart including all the steps from 701 until 724.

SQL Sever 7.0 Implementation

In this section of the detailed description, a particular implementation of the invention is described that is utilized by the Microsoft SQL Server 7.0. The SQL Server 7.0 implementation is described in terms of a compilation process and an execution process.

Subquery Handling in the Compilation Process

Figure 8:
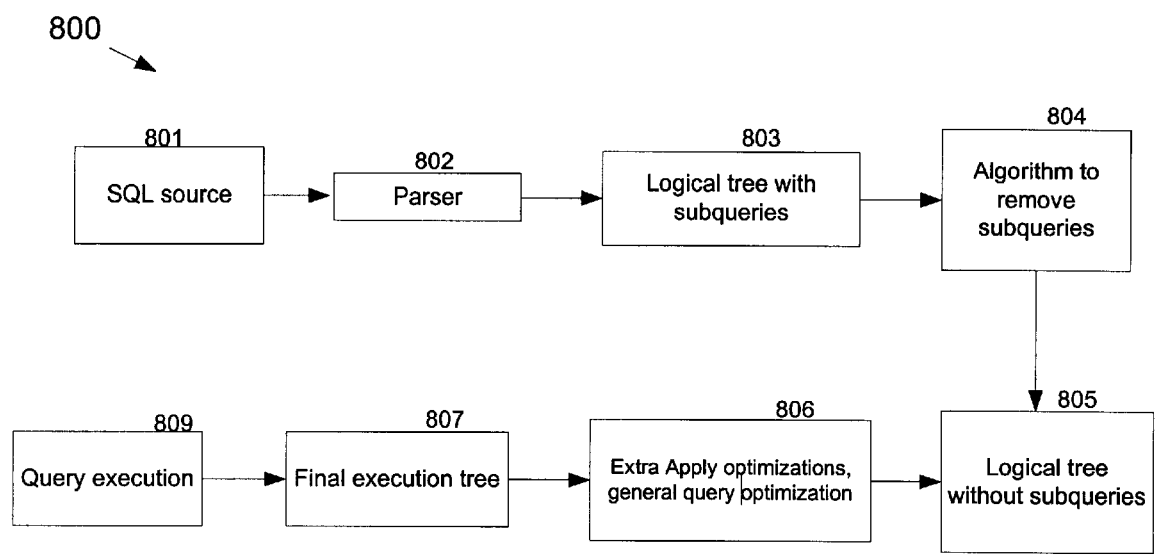
FIG. 8 is a block diagram of an exemplary implementation of the invention.

As illustrated in FIG. 8, the SQL server 800 processes source SQL 801 using a parser and binder 802, which outputs an operator tree 803 with logical operators. The operator tree 803 contains scalar expressions that can contain subqueries. The general subquery removal algorithm 804 (as described previously) is applied to remove all subqueries. The use of the context interpretation property means that the operator trees 805 output by the conversion algorithm 804 are already optimized for the particular query context.

At this point, the compilation process 800 applies a number of algorithms in optimizer 806 to reorder and further process the operator trees 805, including removing the Apply operators, when possible, as discussed further below. A final execution operator tree 807 is generated as input for the query execution database engine 809.

The conversion algorithm 804 removes all subqueries, but introduces Apply operators. When possible, converting Apply into join is useful because it then allows the use of other execution algorithms, such as hash join and merge join. The following optimization rule is used to remove Apply operators of the form:

Apply[inner join/left outerjoin/left semijoin/left antisemijoin](R, S)

Apply[inner join/left outerjoin/left semijoin/left antisemijoin](R, Select(S,p)).

If there are no passthrough predicates, and no probe columns, and there are no references to columns in R from S, then the root apply operator can be replaced by Join/Left Outerjoin/Left Semijoin/Left Antisemijoin, with match predicate, if it is given.

The following optimization allows reversing the order of a lookup condition, so that the subquery is evaluated first, then an index on the outer row is used to lookup the matching values:

Left semijoin[R.A=S.A](R, S)

Evaluate as Join[p](R, Distinct[A](S)).

The following optimization splits multiple ORs in a Left Antisemijoin. Typically, NOT IN subqueries result in match predicates with OR, which cannot be processed using elaborate matching algorithms for joins, e.g. hash join. After removing the OR, it becomes feasible to use hash and merger joins.

Left antisemijoin[p1 OR p2](R, S)

Evaluate as Left antisemijoin[p1](Left antisemijoin[p2] (R, S))S.

During the optimization process, the optimizer 806 determines which parameters are correlated, i.e., those values from the outer relation that are referenced by the inner relational expressions. The sensitive operator list for each correlated parameter is constructed by traversing the inner input looking for operators that directly reference the parameter. Once an operator is determined to be sensitive to a parameter, all operators that consume its output are added to the list as well. The exemplary embodiment of the sensitive operator list data structure 901 shown in FIG. 9 contains an identifier for the correlated parameter 901 and an entry 902 for each operator sensitive to the parameter 901.

Execution Process

Because the final execution operator tree 807 contains no subqueries, the expression service component (ES) of the SQL Server 7.0 execution time database engine 809 does not need to call back into the query executor component (QE).

Any Apply operators that remain in the final execution operator tree 807 are processed by the QE. When executed, an Apply operator creates a re-compute set each time it reads a new row from the outer relation as explained previously. The exemplary embodiment of a re-computer set data structure 1000 in FIG. 10 contains an entry 1001 for each operator affected by a change in value of a correlated parameter. There is a re-compute data structure 1000 for each Apply operator in a query and one of skill in the art will readily recognize that each re-compute data structure is associated with its Apply operator through some identifier (not shown in FIG. 10).

In the exemplary implementation of SQL Server 7.0, caching operators, such as Spool and Sort, buffer output data that results from scanning inner input for a single row in the outer relation. Therefore, the Rewind command described above only rewinds a single row's worth of inner results. In an alternate embodiment, the caching operators buffer output data that corresponds to multiple outer rows. In one such embodiment, the buffer is indexed by the value of the outer parameter and the Rewind command reads the section of the buffer that matches the value of the parameter the new outer row. Additional alternate embodiments that permit the addressing of such a buffer will be immediately apparent to one skilled in the art and are contemplated as within the scope of the invention.

The exemplary implementation of the invention in SQL Server 7.0 converts subqueries into queries that do not contain subqueries and are optimized based on the context for the subquery. SQL Server 7.0 also provides an efficient execution process for the relational operators that replace the subqueries.

CONCLUSION

A relational database system has been described that removes subqueries from an SQL query. The conversion process begins with an expression RELOP(R, e), rooted by some relational expression that operates on relational input R and which uses a scalar expression e with subqueries on each row of R. The conversion algorithm produces new expressions R' and e' such that e' no longer contains subqueries, and R' does not contain subqueries, and the result of RELOP(R, e) is the same as RELOP(R', e').

Instead of executing the original specification on (R, e), which requires calling back into a query evaluation component for subquery evaluation, the database system executes the new specification (R', e'), which reduces query processing time and provides for a simpler database engine implementation. Furthermore, the special relational operator introduced by with the invention provides for additional processing efficiencies.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that any relational operator that provides the required nested loop join functions can be substituted for the Apply operator without affecting the operations of the invention. Furthermore, those of ordinary skill within the art will appreciate that, while certain optimizations have been specified, the invention is equally valid without these optimizations or with additional ones not mentioned.

The terminology used in this application with respect to is meant to include all relational database environments that utilize the SQL query language. Therefore, it is manifestly intended that this invention be limited only by the following claims and equivalents thereof.

We claim:

1. A computerized method for evaluating a database query having at least one expression containing a subquery comprising:

examining each expression in the query to determine if the expression contains a subquery;

if the expression contains a subquery, classifying the expression according to a type; and extending the expression by creating an operator tree structure having a special relational operator as a root, a relation referenced by the subquery as an outer input, and an item representing the subquery as an inner input, wherein properties of the special relational operator are determined by the type of expression;

creating a sensitive operator list based on a set of correlated parameters for the operator tree;

producing output to create a re-computed set based on the sensitive operator list; and reusing previous data when at least one of the set of correlated parameters is unchanged during the processing of the special relational operator tree.

2. The computerized method of claim 1, further comprising:

if the expression is a scalar operator, iterating through the expression to locate a subquery.

3. The computerized method of claim 1, wherein the properties of the special relational operator are further determined by a context indication for the expression.

4. The computerized method of claim 1, wherein the properties are selected from the group consisting of a join predicate, a passthrough predicate, and a probe.

5. The computerized method of claim 4, further comprising:

scanning the outer input for the special relational opertory, wherein the outer input comprises a plurality of outer rows;

evaluating each outer row against the inner input, wherein the inner input comprises a plurality of inner rows; and outputting each outer row and each inner row that match on the join predicate.

6. The computerized method of claim 5, further comprising:

evaluating each outer row against the passthrough predicate property when the passthrough predicate property is present; and outputting the outer row if it satisfies The passthrough predicate without evaluating the outer row against the inner input.

7. The computerized method of claim 6, further comprising:

modifying each outer row with a boolean passthrough column; and outputting the modified outer rows.

8. The computerized method of claim 5, further comprising:

modifying each outer row with a Boolean probe column when the probe property is present; and outputting all the modified outer rows.

9. The computerized method of claim 5, wherein evaluating each outer row against the inner input comprises:

determining if a correlated parameter for the current outer row has changed; and reusing the output from the previous outer row evaluation if the correlated parameter has not changed.

10. A computerized system comprising:

a processing unit;

a system memory coupled to the processing unit through a system bus;

a computer-readable medium coupled to the processing unit through the system bus; and a conversion routine executed from the computer-readable medium by the processing unit, wherein the conversion routine causes the processing unit to replace a subquery in an SQL query with a special relational operator tree;

an optimizer executed from the computer-readable medium by the processing unit, wherein the optimizer causes the processing unit to create a sensitive operator list based on a set of correlated parameters for the relational operator tree; and a query executor executed from the computer-readable medium by the processing unit, wherein the query executor causes the processing unit to process the special relational operator tree to produce output and to create a re-computed set based on the sensitive operator list, wherein the query executor further causes the processing unit to reuse previous data when at least one of the set of correlated parameters is unchanged during processing of the special relational operator tree.

11. The computerized system of claim 10, further comprising:

a query executor executed from the computer-readable medium by the processing unit, wherein the query executor causes the processing unit to process the special relational operator tree to produce output.

12. The computerized system of claim 10, wherein the optimizer further causes the processing unit to replace the special relational operator tree with a join operator tree.

13. A computerized system comprising:

a processing unit;

a system memory coupled to the processing unit through a system bus;

a computer-readable medium coupled to the processing unit through the system bus; and a first program module executed from the computer-readable medium by the processing unit wherein the program causes the processing unit to replace a sub-query in an SQL query with a special relational operator tree;

a second program module executed from the computer-readable medium by the processing unit that causes the processing unit to create a sensitive operator list based on a set of correlated parameters for the relational operator tree; and a third program module executed from the computer-readable medium by the processing unit that causes the processing unit to process the special relational operator tree to produce output and to create a re-computed set based on the sensitive operator list, wherein the third program module causes the processing unit to reuse previous data when at least one of the set of correlated parameters is unchanged during the processing of the special relational operator tree.

* * * * *